Patented June 18, 1946

2,402,123

UNITED STATES PATENT OFFICE 2,402,123

MOISTURE VAPORPROOFING MATERIAL

Lothian M. Burgess and Gene Abson, Chicago, Ill., assignors to H. P. Smith Paper Company, Chicago, Ill., a corporation of Illinois No Drawing. Application July 8, 1943, Serial No. 493,862

2 Claims. (Cl. 260—23)

This invention relates to new and improved heat liquefiable compounds or materials useful for laminating paper, cloth, regenerated cellulose films or sheets, cellulose ether or ester films, foil and the like, to themselves or to each other in two or more plies, for the purpose of rendering such laminated sheets or films resistant to the passage of moisture in vapor or fog form.

In the packaging of various articles of commerce there arises a necessity for preserving them in their manufactured state of moisture content, both by preventing the ingress or egress of moisture. For instance, cigarettes must be prevented from losing moisture in dry climates or from absorbing too much moisture in humid atmosphere; most packaged or wrapped foods must be similarly safeguarded; likewise it is important in packaging of most types of washing powders and soaps. In addition to these types of products it is also of importance to wrap or package metallic products to prevent ingress of moisture with its attendant corrosive action.

We are aware that laminated sheets for such purposes are not new and that various materials for such purpose have been used. These materials are generally bituminous products such as tars or asphalts, various waxes either in hot-melt application or in the form of solutions in solvents or emulsions in water, with or without various modifying agents. There has also been used numerous types of lacquers in solvent solutions; there are also compounds containing film-forming materials such as ethyl cellulose dissolved in wax or wax-like bases with and without a solvent.

The present invention is directed toward the production of laminated sheet material suitable for use as packaging, and to a new and improved bonding composition for rendering the sheet material moisture vapor resistant, the compound being composed of petrolatum, derived from petroleum oil, in combination with a low acid number resin which is compatible with the petrolatum and with jell forming metallic soaps, thereby providing a composition of good viscosity and adhesiveness and excellent bonding ability.

A satisfactory hot-melt laminating compound, in addition to acting as a barrier to the passage of moisture, must also possess (1) sufficient adhesive properties to cement the sheets or films together and keep them from delaminating throughout its useful life under all conditions of climate and atmospheric temperature; (2) be capable of being applied from a heat liquefied condition without penetrating the sheets unduly and at a temperature below that which would injure the paper or film to which it is applied; (3) be of such character that it will not bleed or strike-through under heat sealing conditions of packaging; (4) be stable over a period of years so as not to lose its moisture vapor resistance or adhesiveness either by loss of volatiles, crystallization, embrittlement or molecular rearrangemen; (5) be of such character that it wets and, therefore, spreads to a uniform film of controllable thickness without leaving any uncoated sections or form pinholes, bubbles or any such imperfections as would permit moisture transmission; (6) be non-toxic and free from any elements which would impart odor or taste to food products or which would tend to corrode metals or alloys; (7) be sufficiently flexible and pliable so that the folding and creasing encountered in wrapping and handling does not break the film and allow the passage of moisture vapor therethrough.

Many known materials in the fields of resins, waxes and plastics possess a number of these desirable characteristics but none alone seems to possess them all.

Soft petrolatums when applied in thin films are excellent for resisting the transmission of moisture vapor, but they do not possess sufficient adhesiveness or tackiness or body to laminate paper or similar films and that they alone are so liquid when heated above the melting point that they cannot be applied to paper without almost complete impregnation. These petrolatums, or Vaseline-like materials, are petroleum products separated from reduced crude stocks, usually of the paraffinic type, remaining after the wax distillate containing paraffin has been removed by chilling, usually pre-diluting with naphtha and centrifuging or settling. They are very soft, unctuous, usually dark colored, products generally ranging in melting point from almost room temperature to 140° F. or 150° F. or possibly 155° F. and having a penetration of 77° F., 100 grams 5 seconds, of over 100. However, we prefer to use those which have a melting point of over about 125° F. The petrolatums are very cheap and abundant in quantity, usually considered a waste or by-product, and in many refineries burned as fuel for disposal.

A typical analysis of two commercial petrolatums prepared from Mid-Continent crude oil, the use of which is contemplated herein, is as follows:

|  | 1 | 2 |
|---|---|---|
| Penetration at 77° F., 100 grams 5 seconds. | 285 | 270. |
| Penetration at 32° F., 200 grams 1 minute. | 88 | |
| Melting point, petrolatum method. | 145° F | 126° F. |
| Physical condition | Soft and oily | Soft and oily. |

(American Society for Testing Materials methods were used in all tests.)

In order to render these petrolatums useful, it is necessary to harden them and to make them adhesive. For this purpose we have found, in accordance with the present invention, that by combining with the petrolatum a resin of such character that it is capable of dissolving aluminum soaps such as aluminum mono-stearate, aluminum di-stearate, aluminum tri-stearate, or mixtures thereof, the corresponding oleates, palmitates, etc. with attendant jell formation, that an eminently suitable composition results.

In order for these metallic soaps to disperse in the mixture of resin and petrolatum and form a jell-like structure with great increase in viscosity, it is necessary that the resin have a low acid number, preferably not over 5 to 10, since a much higher acid content would cause a chemical reaction with the metallic soap and reduce or prevent its jell forming characteristics. The petrolatums are entirely inert toward these soaps and furnish excellent jell forming mediums alone and in combination with the low acid resins. The stearates are best introduced slowly when the medium into which it is dispersed is not over 200° F., preferably under 180° F., with continuous agitation and then by slowly raising the temperature to about 250° F. or higher, depending upon the amount used and the viscosity generated, until a clear jell results. When using commercial technical grades of the aluminum soaps such as aluminum stearate, we have found that at least 2% and preferably about 3% is necessary and that not over 8% to 10% would be useful because too viscous a jell would result. With the aluminum oleates we have found that pre-dissolving in about equal parts of petrolatum at a temperature of about 425° F., is helpful because then this mixture can be dissolved in the final compound at the lower temperature of about 300° F., and form a jell. Generally speaking, the oleates form more viscous jells than equivalent proportions of stearates.

In attempting to utilize the soft petrolatums in combination with low acid resins, there arises the problem of being able to obtain sufficient viscosity and high enough melting point to prevent strike-through during application and in bleeding in the finished laminated paper under hot sealing conditions because most of the low acid resins are generally of a lower melting point than the higher acid and saponifiable resins. If lesser amounts of petrolatum are used as an expedient for increasing the viscosity and melting point, then brittleness results with accompanying loss in adhesiveness and moisture vapor resistance. We have discovered, however, that brittleness and non-adhesiveness can be prevented by using the higher ratios of petrolatum to resins, and then artificially increase the viscosity and melting point by the addition of the metallic jell-forming soaps.

Generally speaking, the resins we have found to be useful are the condensation products of pinene or other terpene hydrocarbons, low acid ester gums, hydrogenated ester gums, and similar resins provided only that they do not have any acid value of over about .5 to 10 and are soluble in or miscible with the petrolatums; this latter is not true of all ester gums even those of low acid number. In blending the resins and petrolatum, depending upon the melting point of the resin and the hardness desired in the final compound, we may use from about 30 to about 60 parts of petrolatum and from about 70 to about 40 parts by weight of the resin.

It should be noted here that although the soft petrolatums form highly viscous jells with metallic soaps, they do not develop sufficient adhesiveness to make a good laminating bond and, therefore, need a compatible resin to furnish the necessary body and adhesive properties.

If desired for certain purposes, it is within the purview of this invention to add any petroleum or other waxes to the compound providing the two main considerations of compatibility and jell formation are inherent.

The following examples are illustrative of our compounds, the application thereof, and the resulting products, but are not to be considered as undue limitations.

*Example 1.*—A blended compound of 50 parts by weight of a terpene hydrocarbon condensation product known as "Piccolyte" having a melting point of about 240° F., being hard and brittle at room temperature and 50 parts by weight of 145° F. melting point petrolatum derived from Mid-Continent crude petroleum, was heated to 185° F., and 5 parts by weight of a technical grade of aluminum stearate added slowly with continued slow stirring and gradual increase in temperature. When the temperature reached about 210° F., the aluminum stearate started to dissolve and gradually formed a jell. The heating and stirring were continued to about 280° F., at which temperature the jell was beginning to drop in viscosity and was satisfactory for application. The compound was then applied to a sheet of paper on the under side by means of a roll coater and immediately contacted with a similar sheet, passed through calender rolls and over chill rolls. The compound was applied at the rate of about 15 pounds per ream. It was an excellent laminated product showing greater adhesion than the strength of the fibres and less than 3 grams per 100 square inch of M. V. T. (moisture vapor transmission) per 24 hours, when tested in a General Foods type cabinet at 100° F. and 95%+ relative humidity. When applied at the rate of about 20 pounds per ream, the M. V. T. was reduced to less than 1.5 grams per 100 square inches per 24 hours.

*Example 2.*—60 parts of a hydrogenated ester gum having an acid value of 5.3 were melted together with 40 parts of a petrolatum having a penetration of over 250 at 77° F., and a melting point of 133° F. Then 4 parts of a technical grade of aluminum stearate were added when the base material was at 200° F., and the heating and stirring continued to 300° F., at which time the jell had reached its maximum viscosity and was beginning to recede. This compound was used for laminating the same paper as described in Example 1, and with the same satisfactory final results.

We claim as our invention:

1. A thermoplastic, heat liquefiable normally tacky adhesive composition suitable for forming substantially vapor-proof laminates of sheet material, said composition comprising essentially from about 30 to about 60 parts by weight of petrolatum having a melting point of not in excess of 155° F., and a needle penetration in excess of 100 at 77° F., 100 grams, 5 seconds, and from about 70 to about 40 parts by weight of a compatible terpene hydrocarbon condensation resin, and from about 2% to about 10% of an aluminum soap by weight of the petrolatum and resin, dissolved therein.

2. A thermoplastic, heat liquefiable normally tacky adhesive composition suitable for forming substantially vapor-proof laminates of sheet material, said composition comprising essentially from about 30 to about 60 parts by weight of petrolatum, having a melting point of not in excess of about 155° F., and a needle penetration in excess of 100 at 77° F., 100 grams, 5 seconds, and from about 70 to about 40 parts by weight of a compatible pinene resin, and from about 2% to about 10% of an aluminum soap by weight of the petrolatum and resin, dissolved therein.

LOTHIAN M. BURGESS.
GENE ABSON.